(12) United States Patent
Ahouanto et al.

(10) Patent No.: US 10,427,462 B2
(45) Date of Patent: *Oct. 1, 2019

(54) THIN REINFORCED PRODUCT AND TIRE COMPRISING SAID PRODUCT

(71) Applicants: COMPAGNIE GENERALE DES ETABLISSEMENTS MICHELIN, Clermont-Ferrand (FR); Michelin Recherche et Technique S.A., Granges-Paccot (FR)

(72) Inventors: Michel Ahouanto, Clermont-Ferrand (FR); Sandrine Braud, Clermont-Ferrand (FR); Sebastien Rigo, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 284 days.

This patent is subject to a terminal disclaimer.

(21) Appl. No.: 14/908,322

(22) PCT Filed: Jul. 28, 2014

(86) PCT No.: PCT/EP2014/066143
§ 371 (c)(1),
(2) Date: Jan. 28, 2016

(87) PCT Pub. No.: WO2015/014777
PCT Pub. Date: Feb. 5, 2015

(65) Prior Publication Data
US 2016/0167439 A1    Jun. 16, 2016

(30) Foreign Application Priority Data

Jul. 29, 2013  (FR) ...................................... 13 57457

(51) Int. Cl.
*B60C 9/18*       (2006.01)
*B60C 9/28*       (2006.01)
(Continued)

(52) U.S. Cl.
CPC .......... *B60C 9/2006* (2013.01); *B60C 9/0007* (2013.01); *B60C 9/02* (2013.01);
(Continued)

(58) Field of Classification Search
CPC ..... B60C 9/18; B60C 9/28; B60C 2009/2061; B60C 2009/2067; B60C 2009/2074; B60C 2009/2077
See application file for complete search history.

(56) References Cited

U.S. PATENT DOCUMENTS

| 4,819,705 A | 4/1989 | Caretta ......................... 152/527 |
| 8,763,662 B2 | 7/2014 | Abad et al. ................... 152/451 |

(Continued)

FOREIGN PATENT DOCUMENTS

| EP | 1 186 699 A2 | 3/2002 |
| FR | 2 504 067 A1 | 10/1982 |

(Continued)

OTHER PUBLICATIONS

U.S. Appl. No. 14/908,179, filed Jul. 28, 2014.
(Continued)

*Primary Examiner* — Justin R Fischer
(74) *Attorney, Agent, or Firm* — Venable LLP (57) ABSTRACT

A reinforced product (21) comprises: an elastomer matrix (23), several reinforcing elements (44) embedded in the elastomer matrix (23), the reinforcing elements (44) being arranged side by side in a main direction (X1), Each reinforcing element (44) comprises: several filamentary elements (46), and at least one communal sheath collectively coating the filamentary elements (46) and comprising at (Continued)

least one layer of a thermoplastic polymer composition. The ratio R1=ODO/E of the mean minimum thickness ODO of elastomer present on the back of the sheath to the mean thickness E of the reinforced product (21) is less than or equal to 0.17, the mean minimum thickness of elastomer ODO and mean thickness E of the reinforced product (21) being measured in a direction substantially perpendicular to the main direction (X1).

20 Claims, 2 Drawing Sheets

(51) Int. Cl.

| | | |
|---|---|---|
| *B60C 9/20* | (2006.01) | |
| *B60C 9/00* | (2006.01) | |
| *B60C 9/02* | (2006.01) | |
| *B60C 11/00* | (2006.01) | |
| *B60C 13/00* | (2006.01) | |
| *B60C 15/00* | (2006.01) | |

(52) U.S. Cl.
CPC ............ *B60C 9/2009* (2013.01); *B60C 11/00* (2013.01); *B60C 13/00* (2013.01); *B60C 15/00* (2013.01); *B60C 2009/0014* (2013.01); *B60C 2009/2067* (2013.01); *B60C 2009/2077* (2013.01); *B60C 2009/2083* (2013.01)

(56) References Cited

U.S. PATENT DOCUMENTS

| | | | |
|---|---|---|---|
| 8,785,543 B2 | 7/2014 | Abad et al. | 524/502 |
| 8,790,788 B2 | 7/2014 | Custodero et al. | 428/500 |
| 8,968,871 B2 | 3/2015 | Abad et al. | 428/378 |
| 8,973,634 B2 | 3/2015 | Custodero et al. | 152/451 |
| 2002/0053386 A1 | 5/2002 | Hirachi et al. | 152/529 |
| 2005/0121126 A1 | 6/2005 | Hirachi et al. | 152/451 |
| 2006/0225824 A1 | 10/2006 | Kuwajima et al. | |
| 2012/0125506 A1 | 5/2012 | Custodero et al. | 152/451 |
| 2012/0128972 A1* | 5/2012 | Custodero | B29D 30/38 428/339 |
| 2012/0180921 A1 | 7/2012 | Abad et al. | 152/450 |
| 2012/0267023 A1 | 10/2012 | Abad et al. | 152/451 |
| 2013/0177764 A1 | 7/2013 | Abad et al. | 428/378 |
| 2013/0273366 A1 | 10/2013 | Abad et al. | 428/378 |
| 2013/0280511 A1 | 10/2013 | Abad et al. | 428/220 |
| 2014/0044964 A1 | 2/2014 | Abad et al. | 428/378 |
| 2014/0045983 A1 | 2/2014 | Abad et al. | 524/440 |
| 2014/0045984 A1 | 2/2014 | Abad et al. | 524/440 |
| 2014/0051312 A1 | 2/2014 | Abad et al. | 442/149 |
| 2014/0235124 A1 | 8/2014 | Doisneau et al. | 442/149 |
| 2014/0235125 A1 | 8/2014 | Doisneau et al. | 442/149 |
| 2014/0290204 A1 | 10/2014 | Custodero et al. | 57/7 |
| 2014/0308864 A1 | 10/2014 | Doisneau et al. | 442/149 |
| 2014/0311120 A1 | 10/2014 | Pottier et al. | 57/232 |
| 2015/0004413 A1 | 1/2015 | Abad et al. | 428/378 |
| 2015/0030851 A1 | 1/2015 | Abad et al. | 428/378 |

FOREIGN PATENT DOCUMENTS

| | | | |
|---|---|---|---|
| JP | 63-97404 A | | 4/1988 |
| JP | 04100703 | * | 4/1992 |
| JP | 4-154405 A | | 5/1992 |
| JP | 10-53981 A | | 2/1998 |
| JP | 10-297213 A | | 11/1998 |
| JP | 2003-267002 | * | 9/2003 |
| JP | 2009-83537 A | | 4/2009 |
| WO | 2010/105975 A1 | | 9/2010 |
| WO | 2010/136389 A1 | | 12/2010 |
| WO | 2011/012521 A1 | | 2/2011 |
| WO | 2011/051204 A1 | | 5/2011 |
| WO | 2012/016757 A1 | | 2/2012 |
| WO | 2012/038340 A1 | | 3/2012 |
| WO | 2012/038341 A1 | | 3/2012 |
| WO | 2012/069346 A1 | | 5/2012 |
| WO | 2012/104279 A1 | | 8/2012 |
| WO | 2012/104280 A1 | | 8/2012 |
| WO | 2012/104281 A1 | | 8/2012 |
| WO | 2013/017421 A1 | | 2/2013 |
| WO | 2013/017422 A1 | | 2/2013 |
| WO | 2013/017423 A1 | | 2/2013 |

OTHER PUBLICATIONS

U.S. Appl. No. 14/908,314, filed Jul. 28, 2014.
Submission dated Aug. 1, 2016, in copending U.S. Appl. No. 14/908,179 (38 pages).
International Search Report dated Sep. 30, 2014, issued by EPO in connection with International Application No. PCT/EP2014/066143.

* cited by examiner

THIN REINFORCED PRODUCT AND TIRE COMPRISING SAID PRODUCT

FIELD OF THE INVENTION

The subject of the invention is a reinforced product and a tyre comprising such a product.

The invention applies to passenger vehicles, two-wheeled vehicles, industrial vehicles selected from vans, heavy vehicles such as heavy transport vehicles—i.e. metro trains, buses, road transport vehicles (lorries, tractors, trailers), off-road vehicles—agricultural or construction plant vehicles, aircraft, other transport or handling vehicles.

RELATED ART

A passenger vehicle tyre comprising a carcass reinforcement anchored in two beads and surmounted radially by a crown reinforcement itself surmounted by a tread connected to the beads by two sidewalls is known from the prior art. Circumferential grooves are formed in the tread.

In such a tyre, the crown reinforcement comprises a hoop reinforcement and a working reinforcement. The hoop reinforcement is interposed radially between the tread and the working reinforcement.

The working reinforcement comprises two working plies each forming a reinforced product comprising an elastomer matrix, for example natural rubber, and several reinforcing elements embedded in the elastomer matrix. The reinforcing elements are arranged side by side in a main direction that makes an angle ranging from 15° to 40°, preferably ranging from 20° to 30°, with the circumferential direction of the tyre. The reinforcing elements are crossed from one working ply with respect to the other.

These working plies notably have the prime function of giving the tyre a high "drift thrust" or "cornering" stiffness which in the known way is needed to obtain good road holding ("handling") of the motor vehicle. Other performance aspects are also concerned with the correct operation of the working plies, for example the breaking strength of the reinforced product, high-speed endurance or "breaking energy".

Each reinforcing element comprises a filamentary element such as a single multifilament strand of metallic monofilaments. For example, the multifilament strand is a 2.30 cord comprising two monofilaments of diameter 0.30 mm, cabled or twisted together.

In order to guarantee the endurance of the crown reinforcement, notably the corrosion resistance thereof, it is preferable to have a minimum thickness of elastomer rubber covering each reinforcing element in the radial direction. This thickness is generally referred to as the thickness on the back because it is on the back of the reinforcing element.

Again, in order to guarantee the endurance of the crown reinforcement, the tread comprises, under the circumferential grooves, a mean thickness substantially equal to 2.4 mm of rubber mass separating a radially internal bottom of the circumferential groove from the radially external edge of the crown reinforcement.

These minimum thicknesses of rubber, of the crown reinforcement and of the tread, contribute to making the tyre heavier.

The reinforced product also comprises elastomer bridges. Each elastomer bridge is formed by the mean thickness of elastomer separating two reinforcing elements that are adjacent in the main direction in which the reinforcing elements are arranged side by side.

During the manufacture of the reinforced product, the reinforcing elements are progressed and two strips of elastomer, referred to as skims, are brought in one on each side of the reinforcing elements so as to sandwich the reinforcing elements between the two skims.

In order to ensure that the elastomer penetrates between the reinforcing elements and that the elastomer bridges form correctly, it is preferable to use skims that are relatively thick so that a sufficient quantity of elastomer fills the space between two adjacent reinforcing elements. The significant thickness of the skims also ensures the mean thickness of elastomer on the back required to protect the reinforcing elements.

Thus, the reinforced product has a high mass due in part to the significant mass of elastomer but also to the mass of metal of the reinforcing elements.

It is an object of the invention to reduce the mass of the reinforced product while at the same time guaranteeing the reinforced products satisfactory performance in the tyre.

BRIEF DESCRIPTION OF EMBODIMENTS OF THE INVENTION

To this end, one subject of the invention is a reinforced product comprising:
  an elastomer matrix,
  several reinforcing elements embedded in the elastomer matrix, the reinforcing elements being arranged side by side in a main direction, each reinforcing element comprising:
  several filamentary elements, and
  at least one communal sheath collectively coating the filamentary elements and comprising at least one layer of a thermoplastic polymer composition,
the ratio $R1=ODO/E$ of the mean minimum thickness ODO of elastomer present on the back of the sheath to the mean thickness E of the reinforced product is less than or equal to 0.17, the mean minimum thickness of elastomer ODO and mean thickness E of the reinforced product being measured in a direction substantially perpendicular to the main direction.

The reinforced product according to the invention has a relatively reduced mass as compared with the reinforced product of the prior art. Thanks to the sheath, the quantity of elastomer needed to protect each filamentary element is reduced, since protection is afforded in part by the sheath. Specifically, the sheath constitutes an effective barrier against the corrosive agents likely to penetrate into the reinforced product in the event of the latter coming under attack. In addition, because each filamentary element is protected by the sheath, the thickness of the tread intended to protect the crown reinforcement can be reduced, thereby likewise contributing to reducing the mass of the tyre. Finally, the fact that the sheath collectively coats several filamentary elements means that the reinforced product can achieve a relatively high breaking strength without an increase in mass because the communal sheath makes it possible to reduce the number of rubber bridges while at the same time maintaining, or even increasing, the density of filamentary elements within the reinforced product.

The reinforced product allows the tyre to exhibit performance that is the equivalent of, or even better than, that of the tyre of the prior art, as the comparative tests hereinafter demonstrate. Among all the advantages of the reinforced product, mention may be made of the fact that the sheath has a stiffness somewhere between the stiffness of the filamentary element and the stiffness of the elastomeric matrix. The stiffness between the filamentary element and the elastomeric matrix is therefore less discontinuous than in the absence of a sheath, thereby reducing the stresses applied at the interfaces and improving the overall endurance of the reinforced product.

The reinforced product has the overall shape of a strip extending in a direction perpendicular to the main direction. The width L and thickness E of the reinforced product are such that L>E, preferably L>10·E. Thus, the direction substantially perpendicular to the main direction in which the mean minimum thickness of elastomer ODO and the mean thickness E of the reinforced product are measured is substantially parallel to the thickness E of the strip forming the reinforced product.

In the case of an isolated reinforced product, the mean minimum thickness ODO is measured, on each side of a midplane separating the reinforced product in the main direction into two parts of equal width, over a total axial width of 10 cm (namely between −5 cm and +5 cm with respect to the midplane of the reinforced product) and averaged over the number of measurements taken on the back of the reinforcing elements (namely for example a total of 100 measurements if there are 10 reinforcing elements per cm). The mean thickness E is measured in a similar way by averaging the measurements of the thickness of the reinforced product which are taken at the locations at which reinforcing elements are present.

In the case of a tyre comprising the reinforced product, the mean minimum thickness ODO and the mean thickness E are measured in a similar way on each side of the midplane of the tyre.

A filamentary element means any longilinear element the length of which is great in relation to its cross section, whatever the shape of the latter, for example circular, oblong, rectangular or square, or even flat, it being possible for example for this filamentary element to be twisted or corrugated. When it is of circular shape, its diameter is preferably less than 5 mm, more preferably comprised in a range from 200 µm to 1 mm.

A thermoplastic polymer composition means a composition comprising at least one polymer that has the properties of a thermoplastic polymer. The composition may comprise other polymers, preferably thermoplastic polymers, and possibly elastomers together with other non-polymer components.

An elastomer (or rubber, that in terms being considered to be synonymous), whether in connection with the matrix or with the thermoplastic polymer composition, means any type of elastomer, whether of the diene or non-diene, for example thermoplastic, type.

For preference, the elastomer is a diene elastomer and, more preferably, selected from the group consisting of polybutadienes (BR), synthetic polyisoprenes (IR), natural rubber (NR), butadiene copolymers, isoprene copolymers and mixtures of these elastomers. Such copolymers are more preferably selected from the group consisting of styrene-butadiene copolymers (SBR), isoprene-butadiene copolymers (BIR), isoprene-styrene copolymers (SIR), isoprene-butadiene-styrene copolymers (SBIR) and mixtures of such copolymers.

According to such certain optional and advantageous features of the reinforced product:
the ratio R1 is less than or equal to 0.15, preferably less than or equal to 0.14, and more preferably less than or equal to 0.13.
the ratio R1 is less than or equal to 0.10, preferably less than or equal to 0.08, and more preferably less than or equal to 0.07.
the mean minimum thickness ODO is less than or equal to 0.17 mm, preferably less than or equal to 0.14 mm, more preferably less than or equal to 0.11 mm.

In one embodiment, preferably intended for a tyre for a passenger vehicle, the mean thickness E is less than or equal to 0.95 mm, preferably less than or equal to 0.85 mm, and more preferably less than or equal to 0.75 mm.

Advantageously, the ratio R2=B/E of the mean minimum thickness B of elastomer separating two successive reinforcing elements in the main direction to the mean thickness E of the reinforced product is less than or equal to 1, preferably less than or equal to 0.6, more preferably less than or equal to 0.5 and more preferably still less than or equal to 0.3.

Since the thickness of the elastomer bridges is reduced by virtue of the sheath, the thickness of the skims used in the manufacture and therefore the mass of elastomer of the reinforced product is reduced without thereby reducing the amount of material coating the filamentary element, this material consisting, in the reinforced product, of the sheath and the elastomer matrix.

In the case of an isolated reinforced product, the mean minimum thickness B is measured, on each side of a midplane separating the reinforced product in the main direction into two parts of equal width, over a total axial width of 10 cm (namely between −5 cm and +5 cm with respect to the midplane of the reinforced product) and averaged over the number of measurements taken on the back of the reinforcing elements (namely for example a total of 99 measurements if there are 10 reinforcing elements per cm).

In the case of a tyre comprising the reinforced product, the mean minimum thickness B is measured in the same way on each side of the midplane of the tyre.

In one embodiment, preferably intended for a passenger vehicle tyre, the mean minimum thickness B of elastomer separating two successive reinforcing elements in the main direction is less than or equal to 0.5 mm, preferably less than or equal to 0.35 mm, and, more preferably still, less than or equal to 0.20 mm.

In one embodiment, preferably intended for a tyre for a passenger vehicle, the pitch P at which the reinforcing elements are laid in the main direction is less than or equal to 2.5 mm, preferably less than or equal to 2.1 mm and more preferably less than or equal to 1.9 mm. In this instance, P=1.75 mm. It will be recalled that the laying pitch is the distance, in the distance perpendicular to the axes of two adjacent reinforcing elements, separating two analogous points of these two adjacent reinforcing elements. In other words, the laying pitch is the inter-axis distance between two adjacent reinforcing elements.

If relatively small filamentary elements are being used, it is preferable to have relatively short laying pitch so as to have a reinforced product that has a sufficiently high breaking strength.

Optionally, the mean thickness G of the sheath on the back of each filamentary element in the direction perpendicular to the main direction ranges from 1 µm to 2 mm, preferably from 10 µm and 1 mm, and more preferably from 35 µm to 200 µm.

In the case of an isolated reinforced product, the mean thickness G is measured over a total axial width of 10 cm (namely between −5 cm and +5 cm with respect to the midplane of the reinforced product) and averaged over the number of measurements taken (namely, for example, a total of 100 measurements if there are 10 reinforcing elements per cm). For each measurement, the thickness of the sheath is determined by halving the difference between the bulk of the reinforcing element and the bulk of the filamentary element in a direction perpendicular to the main direction, here the direction substantially parallel to the thickness of the reinforced product.

In the case of a tyre comprising the reinforced product, the mean thickness G is similarly measured on each side of the midplane of the tyre.

In one preferred embodiment, each filamentary element comprises at least one multifilament strand comprising several elementary monofilaments and preferably at least three elementary monofilaments.

For preference, each multifilament strand comprises at least three elementary monofilaments. This then encourages mechanical anchorage of the sheath around and in the filamentary element.

For example, each multifilament strand is a folded textile yarn comprising several multifilament textile fibres twisted together, a textile cord comprising several multifilament textile fibres, a metallic cord comprising several metallic monofilaments or an assembly comprising several textile or metallic cords then referred to as stranded ropes.

In one embodiment, each filamentary element comprises a single multifilament strand.

For preference, each elementary monofilament is metallic.

Metallic by definition means a monofilament made predominantly (namely more than 50% of the mass thereof) or wholly (100% of the mass thereof) from a metallic material. Each monofilament is preferably made of steel, more preferably a pearlite (or ferrite-pearlite) carbon steel referred to hereinafter as "carbon steel" or alternatively of a stainless steel (by definition, a steel containing at least 11% chromium and at least 50% iron).

When use is made of a carbon steel, the carbon content (in % by weight of steel) thereof is preferably comprised between 0.5% and 0.9%. Use is preferably made of a steel of the normal strength (referred to as "NT" for "normal tensile") or high strength (referred to as "HT" for "high tensile") steel cord type of which the tensile strength (Rm) is preferably higher than 2000 MPa, more preferably higher than 2500 MPa and less than 3000 MPa (measured under tensile testing in accordance with ISO 6892, 1984).

In one preferred embodiment, the or each elementary monofilament has a diameter ranging from 0.10 mm to 0.35 mm, preferably from 0.12 mm to 0.26 mm, and more preferably from 0.14 mm to 0.20 mm.

Advantageously, each filamentary element has a mean bulk D in the direction substantially perpendicular to the main direction, the ratio $R3=D/E$ of the mean bulk D to the mean thickness E of the reinforced product is less than or equal to 0.6, preferably less than or equal to 0.57 and more preferably less than or equal to 0.55

The bulk D is measured in a similar way to the way in which the mean thickness G of the sheath is measured either in the reinforced product or in the tyre.

Whereas it is usually recommended to use relatively fat filamentary elements in order to compensate for the loss of mechanical strength caused by oxidation thereof, it is possible here to use filamentary elements of relatively small size because the sheath protects them against oxidation and loss of mechanical strength. Thus, the mean thickness E of the reinforced product and therefore the mass thereof are reduced.

For preference, the thermoplastic polymer composition comprises a thermoplastic polymer, a functionalized diene elastomer, a poly(p-phenylene ether) or a mixture of these materials.

For preference, the functionalized diene elastomer is a thermoplastic styrene elastomer.

In one embodiment, the sheath comprises a single layer of the thermoplastic polymer composition. As an alternative, the sheath comprises several layers, at least one of them comprising a thermoplastic polymer composition.

Thus, the various materials and layers described in applications WO2010/136389, WO2010/105975, WO2011/012521, WO2011/051204, WO2012/016757, WO2012/038340, WO2012/038341, WO2012/069346, WO2012/104279, WO2012/104280 and WO2012/104281 can be used.

Advantageously, the sheath is coated with a layer of an adhesive providing adhesion between the sheath and the elastomer matrix.

The adhesive used is, for example, of the RFL (resorcinol-formaldehyde-latex) type or, for example, as described in the publications WO2013017421, WO2013017422, WO2013017423.

Another subject of the invention is a tyre comprising a reinforced product as defined hereinabove.

In one embodiment, the tyre is intended to be used on a passenger vehicle notably comprising 4×4s and "SUVs" (Sport Utility Vehicles).

In another embodiment, the tyre is intended for an industrial vehicle comprising vans, heavy vehicles such as heavy transport vehicles—i.e. metro trains, buses, road transport vehicles (lorries, tractors, trailers), off-road vehicles—agricultural or construction plant vehicles, aircraft and other transport or handling vehicles.

In one preferred embodiment, with the tyre comprising a crown surmounted by a tread, two sidewalls, two beads, each sidewall connecting each bead to the crown, a carcass reinforcement anchored in each of the beads and extending through the sidewalls as far as the crown, a crown reinforcement interposed radially between the carcass reinforcement and the tread, the crown reinforcement comprises the reinforced product.

For preference, the crown reinforcement comprises a working reinforcement comprising the reinforced product and a hoop reinforcement which is interposed radially between the working reinforcement and the tread.

The hoop reinforcement has the prime function of containing the working plies which, at high speed, are subject to centrifugal force.

For preference, the hoop reinforcement comprises at least one textile hoop reinforcing element.

Textile means that the first and second filamentary elements are made from a material chosen from a polyester, such as polyethylene terephthalate (PET), polyethylene naphthalate (PEN), polybutylene terephthalate (PBT), polybutylene naphthalate (PBN), polypropylene terephthalate (PPT) or polypropylene naphthalate (PPN), a polyamide, for example an aliphatic polyamide such as nylon or an aromatic polyamide such as aramid, a polyketone, a cellulose such as rayon or a mixture of these materials.

The textile hoop reinforcing elements are preferably positioned practically parallel to one another and extend substantially circumferentially around the tyre so as to form an angle comprised in a range from −5° to 5° with the circumferential direction of the tyre.

For preference, the textile hoop reinforcing element(s) of the hoop reinforcement are made of a heat-shrink material.

Advantageously, the thermal contraction CT of each textile hoop reinforcing element of the hoop reinforcement is strictly less than 7.5% and more preferably less than 3.5% after 2 min at 185° C.

The thermal contraction CT is measured, unless otherwise specified, in accordance with standard ASTM D1204-08, for example on equipment of the "TESTRITE" type, under what is referred to as a standard preload of 0.5 cN/tex (which is therefore proportionate to the titre or linear density of the test specimen being tested). The parameter CT can be measured indiscriminately on adhesive-coated initial textile hoop reinforcing elements before they are incorporated into the reinforced product and then the tyre, or alternatively measured on these reinforcing elements once they have been extracted from the tyre and preferably "derubberized" (namely rid of the mass of rubber coating them).

In one embodiment, the tyre comprises at least one circumferential groove formed in the tread. The mean thickness C of mass of rubber of the tread separating a radially internal bottom of the circumferential groove from the radially external edge of the crown reinforcement is preferably less than or equal to 1.5 mm, and more preferably still less than or equal to 1 mm. The mean thickness C means the mean thickness calculated over 5 measurements spread out in the axial direction of the groove.

BRIEF DESCRIPTION OF THE DRAWINGS

The invention will be better understood from reading the description which will follow, given solely by way of non-limiting example and made with reference to the drawings in which.

DETAILED DESCRIPTION OF THE INVENTION

In the following description when using the term "radial" it is appropriate to make a distinction between the various different uses made of this word by those skilled in the art. Firstly, the expression refers to a radius of the tyre. It is in this sense that a point P1 is said to be "radially inside" a point P2 (or "radially on the inside of" the point P2) if it is closer to the axis of rotation of the tyre than is the point P2. Conversely, a point P3 is said to be "radially outside" a point P4 (or "radially on the outside of" the point P4) if it is further away from the axis of rotation of the tyre than is the point P4. Progress will be said to be "radially inwards (or outwards)" when it is in the direction of smaller (or larger) radii. It is this sense of the term that applies also when matters of radial distances are being discussed.

By contrast, a reinforcing element or reinforcement is said to be "radial" when the reinforcing element or the reinforcing elements of the reinforcement make an angle greater than or equal to 65° and less than or equal to 90° with the circumferential direction.

An "axial" direction is a direction parallel to the axis of rotation of the tyre. A point P5 is said to be "axially inside" a point P6 (or "axially on the inside of" the point P6) if it is closer to the midplane M of the tyre than is the point P6. Conversely, a point P7 is said to be "axially outside" a point P8 (or "axially on the outside of" the point P8) if it is further from the midplane M of the tyre than is the point P8.

The "midplane" M of the tyre is the plane that is normal to the axis of rotation of the tyre and situated equal distances from the annular reinforcing structures of each bead.

A "circumferential" direction is a direction which is perpendicular both to a radius of the tyre and to the axial direction.

Furthermore, any range of values denoted by the expression "from a to b" means the range of values extending from the end point "a" up to the end point "b", namely including the strict end points "a" and "b".

Example of a Tyre and of a Reinforced Product According to the Invention

The figures indicate a frame of reference X, Y, Z corresponding to the usual respective axial (X), radial (Y) and circumferential (Z) directions of a tyre.

Figure 1:
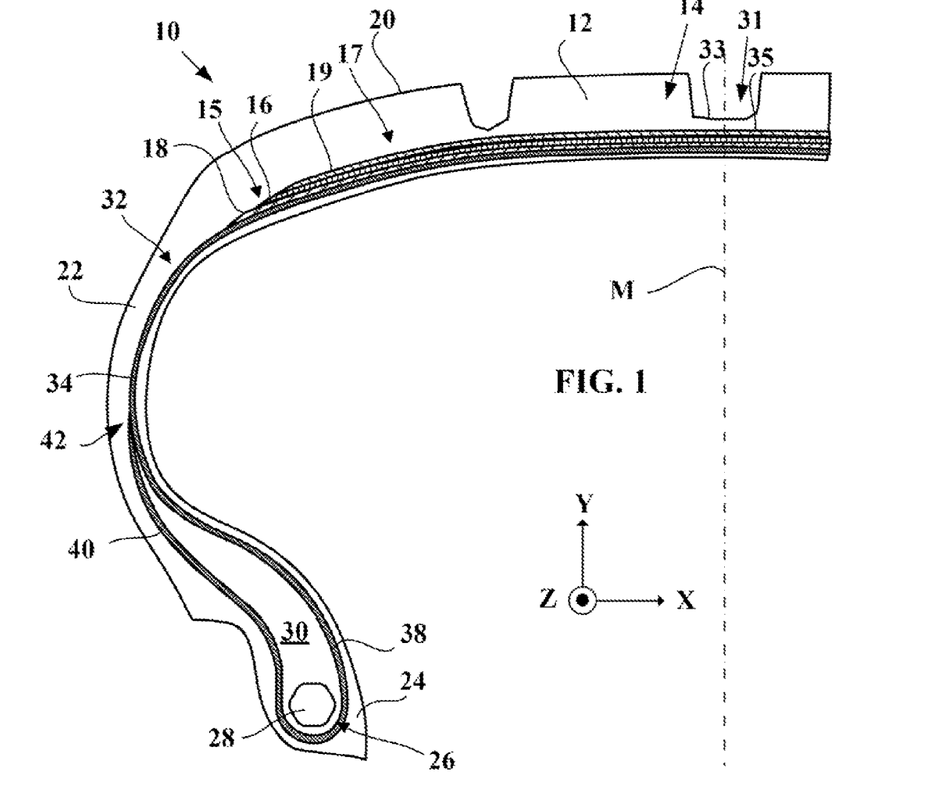
FIG. 1 is a view in cross section of a tyre according to the invention.

FIG. 1 depicts a tyre according to the invention and denoted by the general reference 10. The tyre 10 more or less exhibits symmetry of revolution about an axis substantially parallel to the axial direction X. The tyre 10 here is intended for a passenger vehicle.

The tyre 10 comprises a crown 12 comprising a crown reinforcement 14 comprising a working reinforcement 15 comprising two working plies 16, 18 of reinforcing elements and a hoop reinforcement 17 comprising a hooping ply 19. The crown reinforcement 14 is surmounted by a tread 20. In this instance, the hoop reinforcement 17, in this instance the hooping ply 19, is interposed radially between the working reinforcement 15 and the tread 20.

Two sidewalls 22 extend the crown 12 radially inwards. The tyre 10 further comprises two beads 24 radially on the inside of the sidewalls 22 and each one comprising an annular reinforcing structure 26, in this instance a bead wire 28, surmounted by a mass of filling rubber 30, and a radial carcass reinforcement 32. The crown reinforcement 14 is interposed radially between the carcass reinforcement 32 and the tread 20. Each sidewall 22 connects each bead 24 to the crown 14.

The carcass reinforcement 32 preferably comprises a single carcass ply 34 of radial textile reinforcing elements. The carcass reinforcement 32 is anchored to each of the beads 24 by being folded around the bead wire 28 to form, in each bead 24, a main strand 38 extending from the beads 24 through the sidewalls 22 into the crown 12, and a turnup 40, the radially outer end 42 of the turnup 40 being radially on the outside of the annular reinforcing structure 26. The carcass reinforcement 32 thus extends from the beads 24 through the sidewalls 22 into the crown 12. In this embodiment, the carcass reinforcement 32 also extends axially through the crown 12.

The tyre 10 comprises at least one circumferential groove 31 formed in the tread 20. The mean thickness C of mass of rubber of the tread 20 separating a radially internal bottom 33 of the circumferential groove 31 from the radially external edge 35 of the crown reinforcement 14, in this instance the radially external surface of the hooping ply 19, is preferably less than or equal to 1.5 mm, and more preferably still less than or equal to 1 mm.

Each working ply 16, 18 forms a reinforced product 21 according to the invention comprising reinforcing elements 44 making an angle ranging from 15° and 40°, preferably ranging from 20° to 30° and here equal to 26° with the circumferential direction Z of the tyre 10. The reinforcing elements 44 are crossed from one working ply with respect to the other.

The hooping ply 19 comprises textile hoop reinforcing elements making an angle at most equal to 10°, preferably ranging from 5° to 10°, with the circumferential direction Z of the tyre 10. In this particular instance, the textile hoop reinforcing elements are folded yarns made from a heat-shrink material, in this case polyamide 166, each folded yarn consisting of two 140-tex spun yarns which have been twisted together (on a direct cabling machine) at 250 turns/meter, the diameter of which is equal to approximately 0.66 mm. The thermal contraction CT of each textile hoop reinforcing element is equal to approximately 7%.

Each working ply 16, 18, hooping ply 19 and carcass ply 34 comprises an elastomer matrix 23 in which the reinforcing elements of the corresponding ply are embedded. The rubber compositions of the elastomer matrices 23 of the working plies 16, 18, hooping ply 19 and carcass ply 34 are conventional compositions for the calendering of reinforcing elements comprising in the conventional way a diene elastomer, for example natural rubber, a reinforcing filler, for example carbon black and/or silica, a cross-linking system, for example a vulcanizing system, preferably containing sulphur, stearic acid and zinc oxide, and possibly a vulcanization accelerant and/or retarder and/or various additives.

Figure 2:
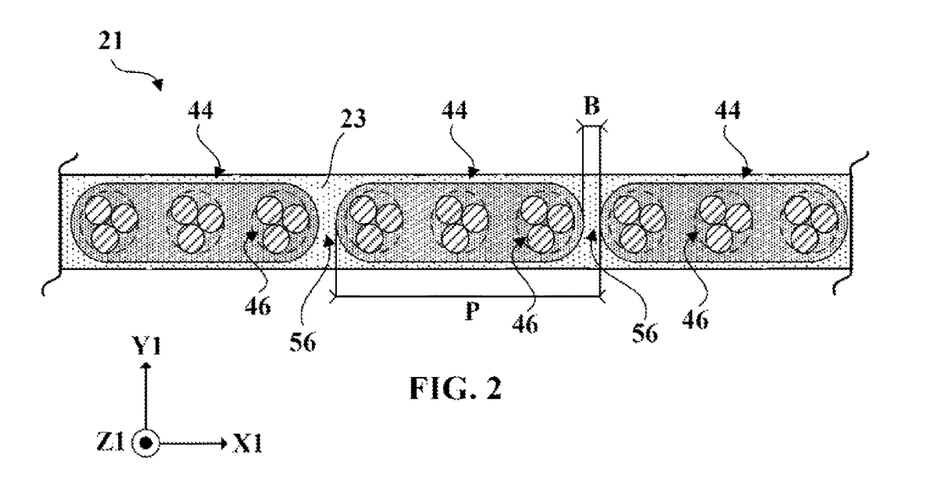
FIG. 2 is a view in cross section of a reinforced product according to the invention, forming a working ply of the tyre of FIG. 1.
Figure 3:
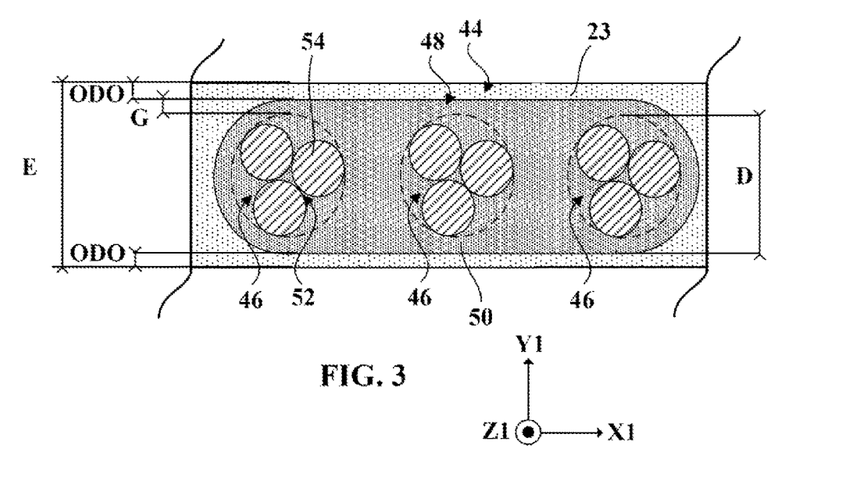
FIG. 3 is a view in cross section of a reinforcing element of the reinforced product of FIG. 2.

FIGS. 2 and 3 depict the reinforced product 21 and the reinforcing elements 44 in a frame of reference X1, Y1, Z1 in which the direction Y1 is substantially parallel to the radial direction Y and the directions X1 and Z1 make an angle ranging from 15° and 40°, preferably ranging from 20° to 30° and here equal to 26°, with the axial X and circumferential Z directions respectively. In these FIGS. 2 and 3, the reinforcing elements 44 of the reinforced product 21 are arranged side by side in the main direction X1. The reinforcing elements 44 run parallel to one another. Each reinforcing element 44 comprises several filamentary elements 46 extending in the direction Z1 making, when in the tyre 10, an angle of 26° with the circumferential direction Z of the tyre 10. Each reinforcing element 44 also comprises at least one communal sheath 48 collectively coating the filamentary elements 46, in groups of several filamentary elements, in this instance between 2 and 5, and in this instance in groups of 3 filamentary elements, and comprising at least one layer 50 of a thermoplastic polymer composition.

Each filamentary element 46 comprises at least one multifilament strand 52, in this instance a single multifilament strand 52, comprising several, in this instance at least three, elementary monofilaments 54. Each elementary monofilament 54 is metallic, in this instance made of steel coated with a protective coating containing for example brass or zinc. Each elementary monofilament 54 has a diameter ranging from 0.10 mm to 0.35 mm, preferably from 0.12 mm to 0.26 mm, and more preferably from 0.14 mm to 0.20 mm and in this instance equal to 0.18 mm.

Each filamentary element 46 has a mean bulk D in the direction Y1 substantially perpendicular to the main direction X1, in this instance in the direction of the thickness of the reinforced product 21. The bulk D is here equal to the diameter of the circle circumscribing the filamentary element 46. In this instance, D=0.38 mm.

The sheath 48 has a mean thickness G on the back of each filamentary element 46 in the direction Y1 perpendicular to the main direction X1 ranging from 1 μm to 2 mm, preferably from 10 μm and 1 mm and more preferably from 35 μm to 200 μm. Here, G=75 μm.

The sheath 48 comprises a single layer 50 of the thermoplastic polymer composition comprises a thermoplastic polymer, a functionalized diene elastomer, a poly(p-phenylene ether) or a mixture of these materials. In this instance, the thermoplastic polymer composition comprises a thermoplastic polymer, for example polyamide 66. Optionally, the thermoplastic polymer composition may comprise a functionalized diene elastomer, for example a thermoplastic styrene comprising an epoxide, carbonyl, anhydride or ester function and/or a poly-p-phenylene ether.

The sheath 48 is coated with a layer of an adhesive (not depicted) providing adhesion between the sheath 48 and the elastomer matrix 23.

The mean thickness E of the reinforced product, in this instance of each working ply 16, 18, is less than or equal to 0.95 mm, preferably less than or equal to 0.85 mm, and more preferably less than or equal to 0.75 mm and in this instance E=0.7 mm.

The mean minimum thickness ODO of elastomer present on the back of the sheath is less than or equal to 0.17 mm, preferably less than or equal to 0.14 mm, and more preferably less than or equal to 0.11 mm, and in this instance ODO=0.09 mm.

The mean minimum thickness of elastomer ODO and mean thickness E of the reinforced product are measured in a direction substantially perpendicular to the main direction X1, in this instance in the direction Y1 parallel to the thickness of the reinforced product 21 which, once in the tyre, is the radial direction Y of the tyre 10.

The ratio R1=ODO/E of the mean minimum thickness ODO of elastomer present on the back of the sheath 48 to the mean thickness E of the reinforced product 21 is less than or equal to 0.17. In this instance, R1 is less than or equal to 0.15, preferably less than or equal to 0.14, and more preferably less than or equal to 0.13. In this instance, R1=0.13.

The pitch P at which the reinforcing elements 44 are laid in the main direction X1 is less than or equal to 2.5 mm, preferably less than or equal to 2.1 mm and, more preferably, less than or equal to 1.9 mm. In this instance, P=1.75 mm.

The reinforced product 21 comprises elastomer bridges 56 separating two successive reinforcing elements 44. The mean minimum thickness B of each elastomer bridge 56 in the main direction X1 is less than or equal to 0.5 mm, preferably less than or equal to 0.35 mm, more preferably less than or equal to 0.20 mm and, in this instance, B=0.17 mm.

The ratio R2=B/E of the mean minimum thickness B of elastomer separating two successive reinforcing elements to the mean thickness E of the reinforced product 21 is less than or equal to 1, preferably less than or equal to 0.6, more preferably less than or equal to 0.5, and more preferably still less than or equal to 0.3 and in this instance R2=0.24.

The ratio R3=D/E of the mean bulk D to the mean thickness E of the reinforced product 21 is less than or equal to 0.6, preferably less than or equal to 0.57, and more preferably less than or equal to 0.55. In this instance R3=0.54.

Comparative Tests

Figure 4:
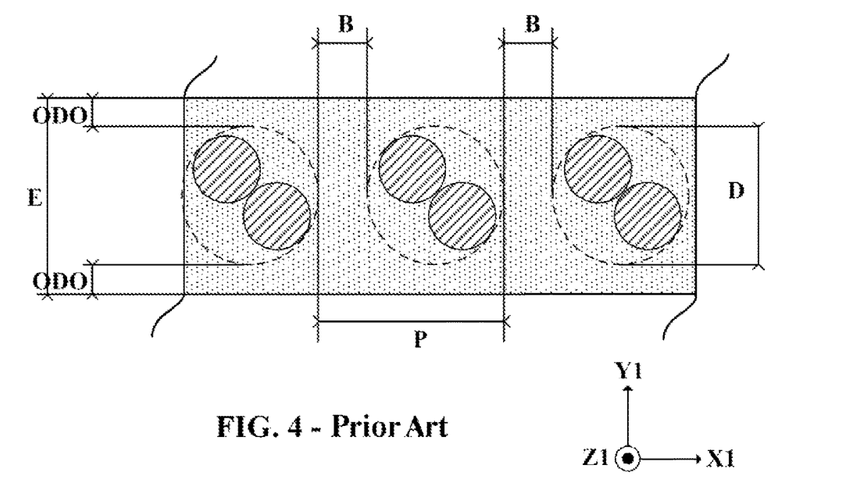
FIG. 4 is a view similar to that of FIG. 2 of a reinforced product of the prior art.

The reinforced product 21 and the tyre 10 according to the invention all as described hereinabove were compared against a reinforced product T and a control tyre PT of the prior art. The reinforced product T is depicted in FIG. 4. Each filamentary element of the reinforced product T comprises a multifilament strand of two 0.30 mm elementary monofilaments twisted together. The characteristics of the reinforced products and the tyres are collated in Table 1 below.

All the data indicated hereinabove (E, ODO, B, G, D and P) are mean values measured experimentally by an operator on photographs of radial cross sections of reinforced products or of tyres performed as indicated earlier over 5 cm on each side of the midplane of the reinforced product or of the tyre.

TABLE 1

|    | E (mm) | ODO (mm) | B (mm) | G (μm) | D (mm) | P (mm) | R1 | R2 | R3 |
|----|--------|----------|--------|--------|--------|--------|-----|-----|-----|
| T  | 0.94   | 0.17     | 0.60   | 0      | 0.60   | 1.2    | 0.18 | 0.64 | 0.64 |
| 21 | 0.7    | 0.09     | 0.17   | 75     | 0.38   | 1.75   | 0.13 | 0.24 | 0.54 |

The reinforced products T and 21 and the tyres PT and 10 were subjected to various tests described hereinbelow and the results of which are collated in Table 2. Unless stated otherwise, the results are given to base 100 with respect to the control product T and control tyre PT. Thus, the greater the extent to which the value exceeds 100, the better the performance of the reinforced product or of the tyre according to the invention by comparison with the reinforced product or with the control tyre.

The breaking strength of the reinforced product is measured by determining the force at break under tensile testing of each filamentary element in accordance with ISO 6892, 1984 and then multiplying this by the linear density of the filamentary elements in the main direction of the reinforced product The high-speed endurance is measured by subjecting each tyre, on a machine, to a progressive increase in speed, in determined levels, up to a preset limit speed or until, where applicable, the tested tyres are destroyed before the end of the test.

The "breaking energy" is measured in accordance with standard ASTM WK20631.

To measure the cornering stiffness, each tyre is run at a constant speed of 80 km/h on an appropriate automatic machine (machine of the "flat track" rolling road type marketed by the company MTS), by varying the load denoted "Z", under a drift angle of 1 degree, and the drift thrust was measured continuously to identify the drift thrust or cornering stiffness denoted "D" (corrected for the drift thrust at zero drift angle), by using sensors to record the transverse load on the wheel as a function of this load "Z"; this then gives the drift thrust or cornering stiffness. For a chosen load, here of 450 daN, this then yields the value reported in Table 2 below.

For the hard cornering (high drift) endurance test, the tyre being tested is run at a speed of 20 km·h$^{-1}$ on a smooth dynamometer with an imposed drift angle of substantially 5 degrees. The drift thrust exerted by the tyre is continuously logged until a certain distance travelled is reached. During this observation, the drift thrust exerted by the tyre decreases as a result of degradation of the crown reinforcement of the tyre and notably of the working plies. When the predetermined distance has been covered, the drift thrust exerted by the tyre is recorded. The tyre tested is then stripped down to examine the working plies and the number of breaks in the working reinforcement is counted.

TABLE 2

| Performance of the reinforced product | T | 21 |
|---|---|---|
| Weight of elastomer in the reinforced product (base 100) | 100 | 150 |
| Total weight of the reinforced product (base 100) | 100 | 105 |
| Breaking strength of the reinforced product (base 100) | 100 | 100 |
| Performance of the tyre | PT | 10 |
| High-speed endurance (base 100) | 100 | 100 |
| Breaking energy (base 100) | 100 | 108 |
| Drift thrust Dz (base 100) | 100 | 109 |
| Hard endurance - Drift thrust measured on covering the predetermined distance (base 100) | 100 | 100 |
| Hard endurance - number of breaks in the filamentary element | 20 | 1 |

Thus it is found that, for all other things being equal, in addition to having a reduced mass, the reinforced product and the tyre according to the invention offer aspects of performance equivalent, or even superior, to those of the reinforced product and of the control tyre. In particular, it is found that the tyre according to the invention has a breaking energy and a drift thrust far higher than those of the control tyre PT.

Furthermore, it is noted that the tyre 10 according to the invention, on the hard cornering/high drift endurance test, displays performance that is equivalent, or even superior, to that measured on the control tyre PT. Indeed the drift thrust measured at the end of the test on the tyre 10 according to the invention is equivalent to that measured on the control tyre PT. After the tested tyres had been stripped down it was found that there was just one cord broken in the tyre 10 according to the invention, as compared with 20 cords broken in the control tyre PT, which means that the tyre 10 according to the invention is a more robust tyre than the control tyre PT.

The invention is not restricted to the embodiments described hereinabove.

Specifically, a tyre according to the invention in which the crown reinforcement also comprises a protective reinforcement interposed radially between the hoop reinforcement and the working reinforcement is also conceivable.

Also conceivable is a tyre according to the invention in which the crown reinforcement has no hoop reinforcement but a protective reinforcement and a working reinforcement, the protective reinforcement being interposed radially between the tread and the working reinforcement.

The features of the various embodiments described or contemplated hereinabove may also be combined provided that they are mutually compatible.

The invention claimed is:

1. A tire comprising:
   a crown surmounted by a tread,
   two sidewalls,
   two beads, each sidewall connecting each bead to the crown,
   a carcass reinforcement anchored in each of the beads and extending through the sidewalls as far as the crown, and
   a crown reinforcement interposed radially between the carcass reinforcement and the tread,
   wherein the tire is a passenger vehicle tire, and
   wherein the crown reinforcement is a reinforced product comprising:
   an elastomer matrix, several reinforcing elements embedded in the elastomer matrix, the reinforcing elements being arranged side by side in a main direction, each reinforcing element comprising:

several filamentary elements, and at least one communal sheath collectively coating the filamentary elements and comprising at least one layer of a thermoplastic polymer composition, wherein a mean thickness E of the reinforced product is less than or equal to 0.95 mm;

wherein a pitch P at which the reinforcing elements are laid in the main direction is less than or equal to 2.5 mm;

wherein the ratio R1=ODO/E of the mean minimum thickness ODO of elastomer present on the sheath to the mean thickness E of the reinforced product is less than or equal to 0.17, the mean minimum thickness of elastomer ODO and mean thickness E of the reinforced product being measured in a direction substantially perpendicular to the main direction;

wherein the ratio R2=B/E of the mean minimum thickness B of elastomer separating two successive reinforcing elements in the main direction to the mean thickness E of the reinforced product is less than or equal to 0.3;

wherein each filamentary element has a mean bulk D in the direction substantially perpendicular to the main direction, and wherein the ratio R3=D/E of the mean bulk D to the mean thickness E of the reinforced product is less than or equal to 0.6.

2. The tire according to claim 1, wherein the ratio R1 is less than or equal to 0.15.

3. The tire according to claim 1, wherein the ratio R1 is less than or equal to 0.10.

4. The tire according to claim 1, wherein the ratio R1 is less than or equal to 0.07.

5. The tire according to claim 1, wherein the mean minimum thickness ODO is less than or equal to 0.17 mm.

6. The tire according to claim 1, wherein the mean minimum thickness ODO is less than or equal to 0.11 mm.

7. The tire according to claim 1, wherein the mean thickness E is less than or equal to 0.75 mm.

8. The tire according to claim 1, wherein the mean minimum thickness B of elastomer separating two successive reinforcing elements in the main direction is less than or equal to 0.5 mm.

9. The tire according to claim 1, wherein the mean minimum thickness B of elastomer separating two successive reinforcing elements in the main direction is less than or equal to 0.20 mm.

10. The tire according to claim 1, wherein the pitch P at which the reinforcing elements are laid in the main direction is less than or equal to 2.1 mm.

11. The tire according to claim 1, wherein the pitch P at which the reinforcing elements are laid in the main direction is less than or equal to 1.9 mm.

12. The tire according to claim 1, wherein the mean thickness G of the sheath on each filamentary element in the direction substantially perpendicular to the main direction ranges from 35 µm to 200 µm.

13. The tire according to claim 1, wherein each filamentary element comprises at least one multifilament strand comprising several elementary monofilaments.

14. The tire according to claim 13, wherein each elementary monofilament is metallic.

15. The tire according to claim 14, wherein each elementary monofilament has a diameter ranging from 0.10 mm to 0.35 mm.

16. The tire according to claim 13, wherein each elementary monofilament has a diameter ranging from 0.10 mm to 0.35 mm.

17. The tire according to claim 1, wherein each filamentary element has a mean bulk D in the direction substantially perpendicular to the main direction, and wherein the ratio R3=D/E of the mean bulk D to the mean thickness E of the reinforced product is less than or equal to 0.55.

18. The tire according to claim 1, wherein the thermoplastic polymer composition comprises a thermoplastic polymer, a functionalized diene elastomer, a poly(p-phenylene ether) or a mixture of these materials.

19. The tire according to claim 1, wherein the sheath is coated with a layer of an adhesive providing adhesion between the sheath and the elastomer matrix.

20. The tire according to claim 1, wherein the crown reinforcement comprises a working reinforcement comprising the reinforced product and a hoop reinforcement which is interposed radially between the working reinforcement and the tread.

* * * * *